(12) United States Patent
Sudarsan et al.

(10) Patent No.: US 10,891,492 B2
(45) Date of Patent: Jan. 12, 2021

(54) METHOD AND A SYSTEM FOR PROVIDING PRIVACY ENABLED SURVEILLANCE IN A BUILDING

(71) Applicant: ABB Schweiz AG, Baden (CH)

(72) Inventors: Sithu Dhamodharan Sudarsan, Madurai (IN); Girish Nadig, Bangalore (IN); Sriharsha Vardhan, Bangalore (IN)

(73) Assignee: ABB Schweiz AG, Baden (CH)

(*) Notice: Subject to any disclaimer, the term of this patent is extended or adjusted under 35 U.S.C. 154(b) by 100 days.

(21) Appl. No.: 16/474,058

(22) PCT Filed: Dec. 30, 2016

(86) PCT No.: PCT/IB2016/058090
§ 371 (c)(1),
(2) Date: Jun. 26, 2019

(87) PCT Pub. No.: WO2018/122581
PCT Pub. Date: Jul. 5, 2018

(65) Prior Publication Data
US 2019/0332871 A1 Oct. 31, 2019

(51) Int. Cl.
*G06K 9/00* (2006.01)
*G06F 21/32* (2013.01)
*G08B 13/196* (2006.01)

(52) U.S. Cl.
CPC ......... *G06K 9/00771* (2013.01); *G06F 21/32* (2013.01); *G06K 9/00228* (2013.01); *G06K 9/00362* (2013.01); *G08B 13/19686* (2013.01)

(58) Field of Classification Search
CPC G06F 21/32; G06K 9/00228; G06K 9/00362; G06K 9/00771; G08B 13/19669; G08B 13/19686
See application file for complete search history.

(56) References Cited

U.S. PATENT DOCUMENTS

2006/0064384 A1* 3/2006 Mehrotra ......... G08B 13/19608
705/57
2008/0068459 A1 3/2008 Wong et al.
(Continued)

FOREIGN PATENT DOCUMENTS

EP 3026904 A1 6/2016
WO 2008112954 A1 9/2008

OTHER PUBLICATIONS

Search Report & Written Opinion issued in App. No. PCT/IB2016/058090 (2018).
(Continued)

*Primary Examiner* — Xin Jia
(74) *Attorney, Agent, or Firm* — Barnes & Thornburg LLP

(57) ABSTRACT

The present invention relates to methods and systems for providing privacy enabled surveillance for a portion of a building with a building automation system. The building automation system comprises sensors communicatively coupled to a controller. The controller detects a number of persons based on information from a first set of sensors, authenticates the number of persons detected with the first set of sensors by comparing the information from the first set of sensors with registered information of the building automation system, determines a number of authenticated persons, detects the number of persons based on information from a second set of sensors for detecting physical parameters associated with the portion of the building, and activates a sensor for surveillance based on a difference between the number of authenticated persons in the portion of the building and the number of persons detected by the second set of sensors.

10 Claims, 4 Drawing Sheets

(56) References Cited

U.S. PATENT DOCUMENTS

| | | | | |
|---|---|---|---|---|
| 2014/0309813 A1* | 10/2014 | Ricci | ............... | G06F 16/25 |
| | | | | 701/2 |
| 2016/0203699 A1* | 7/2016 | Mulhern | ............... | G08B 5/22 |
| | | | | 340/573.1 |
| 2016/0335865 A1* | 11/2016 | Sayavong | ............... | G08B 13/2491 |
| 2018/0018508 A1* | 1/2018 | Tusch | ............... | G06K 9/00771 |

OTHER PUBLICATIONS

International Preliminary Report on Patentability issued in App. No. PCT/IB2016/058090 (2019).

* cited by examiner

METHOD AND A SYSTEM FOR PROVIDING PRIVACY ENABLED SURVEILLANCE IN A BUILDING

CROSS-REFERENCE TO RELATED APPLICATION

This application is a national stage entry under 35 U.S.C. § 371 of PCT International Stage Patent Application No. PCT/IB2016/058090, filed Dec. 30, 2016, the entire disclosure of which is incorporated herein by reference.

FIELD OF THE INVENTION

The present invention relates generally to building automation systems and more particularly to a method and system for providing privacy enabled surveillance for a portion of a building with a building automation system.

BACKGROUND OF THE INVENTION

Modern buildings can be supported with a building automation system that manages various functions and services of a building including specific services customized to a portion of a building (e.g., a floor or a room), managing appliances in a building (e.g., air conditioning, lights and home appliances such as security system, music system, refrigerators, washing machines, etc.). With the advent of several intelligent/smart sensors and hand held management/utility systems deployed to support individuals and enterprises with value added information and services, and their use to support modern life style, it is common to find building automation systems capable of integrating these sensors and value adding systems to enhance the technology capability and user experience of the building automation system. An important aspect concerns management of building security and surveillance systems.

Systems for detecting and reporting intrusions and other types of events in a portion of a building are well known in the prior art. These systems rely on various types of sensors including, but not limited to, cameras, night vision devices, sensors for detecting movement, vibration or sounds, sensors for detecting fire and/or smoke or other functions including temperature or low heating fuel, an audible and/or visual alarm. These systems are useful in terms of generating appropriate alarms, providing access to emergency support services, and recording of an event for forensic and other analysis as may be needed. However, this comes at a cost of reduced privacy for the persons residing in areas monitored by devices capable of recording private information such as cameras, night vision devices or audio recorders and the like.

It is a well-known fact that some of the most private areas in a residential building like the bedroom also consist of 'personal safes' for storing valuables and these private areas can potentially become a target for intruders or unwanted persons such as burglars and robbers. In order to fulfil the purpose of providing security in a building even a private area of the building is required to be secured with the utmost level of security. However, due to privacy breach concerns these security systems avoid installing sensors capable of capturing private or personal information in private areas like bedrooms and thus, in case of an intrusion in private areas, such security systems fail to serve their purpose. In certain scenarios, sensors capable of capturing and recording information are installed in private areas, but with options for disablement on demand. Hence, in an accidental intrusion during a state of disablement of the sensors in the private areas, such security systems again fail to serve their purpose. This defeats the very purpose of having a security system installed and establishes a challenge to provide security to a building while protecting the privacy of the persons residing in it.

SUMMARY

The above-mentioned shortcomings, disadvantages and problems are addressed herein which will be understood by reading and understanding the following specification.

In one aspect, the present invention provides a method for providing privacy enabled surveillance for at least one portion of a building with a building automation system, the building automation system comprising a plurality of sensors communicatively coupled to a controller of the building automation system, wherein the plurality of sensors include a first set of sensors for detecting person-related information to identify a person and a second set of sensors for detecting physical parameters associated with the at least one portion of the building, the method comprising, the controller: detecting a number of persons in the at least one portion of the building based on information from the at least one first set of sensors for detecting person-related information that identifies a person; authenticating the number of persons detected with the first set of sensors by comparing the information from the first set of sensors with a registered information with the building automation system and determining a number of authenticated persons in the portion of the building based on successful authentication; detecting a number of persons in the portion of the building based on information from the second set of sensor for detecting physical parameters associated with the at least one portion of the building; and activating at least one sensor from the plurality of sensors for surveillance in the at least one portion of the building based on a difference between the number of authenticated persons in the portion of the building and the number of detected persons by the second set of sensors.

In an embodiment, the method described herein above further comprising activating an alerting unit based on the difference between the number of determined number of authenticated persons in the portion of the building and the number of detected persons by the second set of sensors.

In an embodiment, the method described herein above further comprising activating an alerting unit based on analyzed information from the activated third sensor for surveillance.

In an embodiment, the method described herein above further comprising activating at least one home appliance based on information from: the at least one sensor that is capable of sensing information that identifies an individual; and the at least one sensor that is capable of sensing parameters related to a building.

In an embodiment, the method described herein above further wherein the information from at least one first set of sensors that identifies a person comprises biometric information of the person.

In an embodiment, the present invention also provides a building automation system for providing privacy enabled surveillance for at least one portion of a building, the building automation system comprising: a plurality of sensors including a first set of sensors for detecting person-related information to identify a person and a second set of sensors for detecting physical parameters associated with the at least one portion of the building, a controller wherein the plurality of sensors is communicatively coupled to the controller, the controller is configured to: detect a number of persons in the at least one portion of the building based on information from the at least one first set of sensors for detecting person-related information that identifies a person; authenticate the number of persons detected with the first set of sensors by comparing the information from the first set of sensors with a registered information with the building automation system and determining the number of authenticated persons in the portion of the building based on successful authentication; detect a number of persons in the portion of the building based on information from the second set of sensors for detecting physical parameters associated with the at least one portion of the building; and activate at least one sensor from the plurality of sensors for surveillance in the at least one portion of the building based on the difference between the number of determined number of authenticated persons in the portion of the building and the number of detected persons by the second set of sensors.

In an embodiment of the building automation system mentioned herein, wherein the controller is further configured to operate in at least one of a privacy mode, party mode, and away mode.

In an embodiment of the building automation system mentioned herein, wherein the controller is interfaced one-to-one for communicating with the plurality of sensors.

In an embodiment of the building automation system mentioned herein, wherein the controller is interfaced through KNX communication protocol.

In an embodiment of the building automation system mentioned herein, wherein the first set of sensors for detecting person-related information to identify a person are biometric sensors; wherein the biometric sensors include sensors for iris recognition, fingerprint, gesture recognition, palm veins, face recognition, gaze, health and wellness, voice recognition, hand geometry, and body odor.

DETAILED DESCRIPTION

The present invention is related to a method and a system for providing privacy enabled surveillance for a portion of a building with a building automation system. Current home and building security systems rely on activity monitoring, recording and generating alarms to provide security. Video monitoring happens in all these systems with recording enabled. While this enables security, privacy of the persons residing in the monitored areas with enabled recording is thus compromised. In order to overcome this drawback the present invention provides a method and a system that enables recording of the monitored areas only in the event of an unusual/unfamiliar or exigent event.

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized. The following detailed description is, therefore, not to be taken in a limiting sense.

Figure 1:
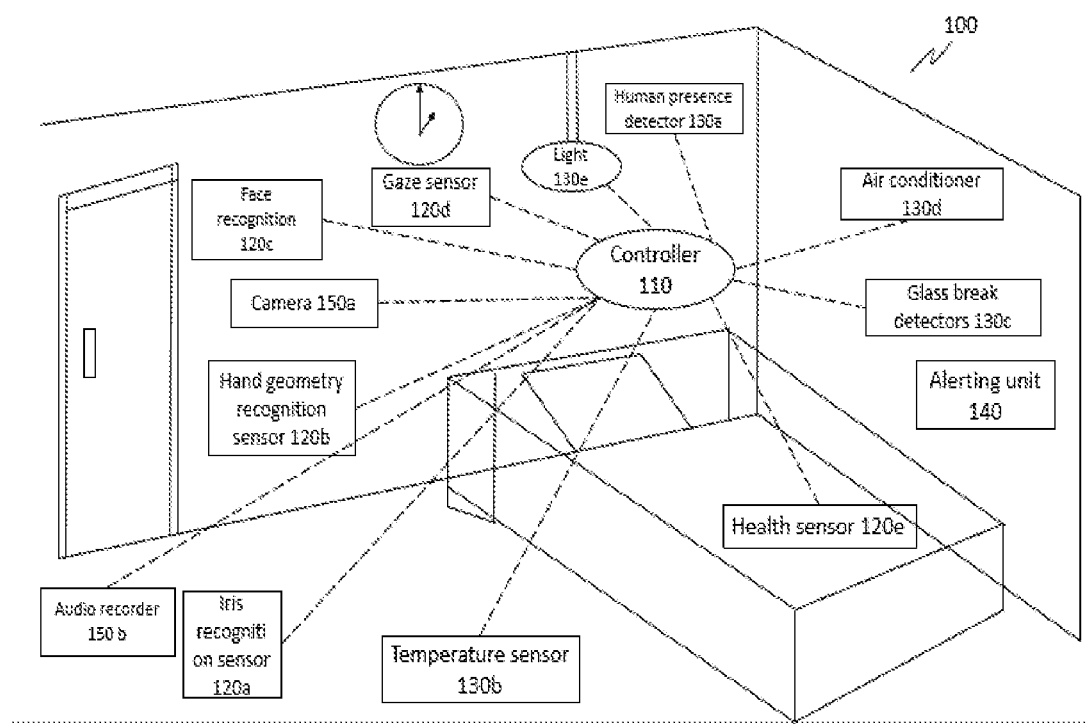
FIG. 1 illustrates a view of a portion of a building managed by a building automation system for providing privacy enabled surveillance.

FIG. 1 illustrates a view of a portion of a building 100 managed by a building automation system for providing privacy enabled surveillance. As an exemplary embodiment, the portion of the building shown in FIG. 1 is a bedroom with typical amenities including but not limited to light, wall clock, chair, bed, air conditioners. As shown in FIG. 1, a plurality of sensors are communicatively coupled with a controller 110. The plurality of sensors comprise iris recognition sensor 120a, hand geometry recognition sensor 120b, face recognition sensor 120c, gaze sensor 120d, health sensors 120e, human presence detector 130a, temperature sensor 130b, glass break detector 130c, air conditioner detector 130d, light 130e, camera 150a and audio recorders 150b. An alerting unit 140 is also coupled to the controller 110 for alerting concerned authorities in case an emergency is detected or to trigger one or more alarms such as audio, visual, message, e-mail, phone etc.

As shown in FIG. 1, the view of the portion of a building 100 managed by the building automation system comprises a plurality of sensors that are capable of detecting parameters that can be processed to obtain information to identify a person (person-related information to identify a person). These sensors can be biometric sensors, image capturing sensors, acoustic sensors, etc., along with regular sensors that are capable of detecting physical parameters (ambient temperature, light intensity, air quality, smoke/fire detection, noise detection, glass break detection, etc.) associated with a portion of a building. Biometric sensors may include, but are not limited to, sensors for iris recognition, fingerprint, gesture recognition, palm veins, face recognition, gaze, health and wellness, voice recognition, hand geometry and body odor. Sensors that are capable of detecting physical parameters associated with a portion of a building additionally include sensors for detecting the number of persons present in that portion of the building by detection of physical parameters with human presence detectors, e.g., with/based on door open/close sensors, heat or light sensing, vibration sensing, movement sensing, etc.

Figure 2:
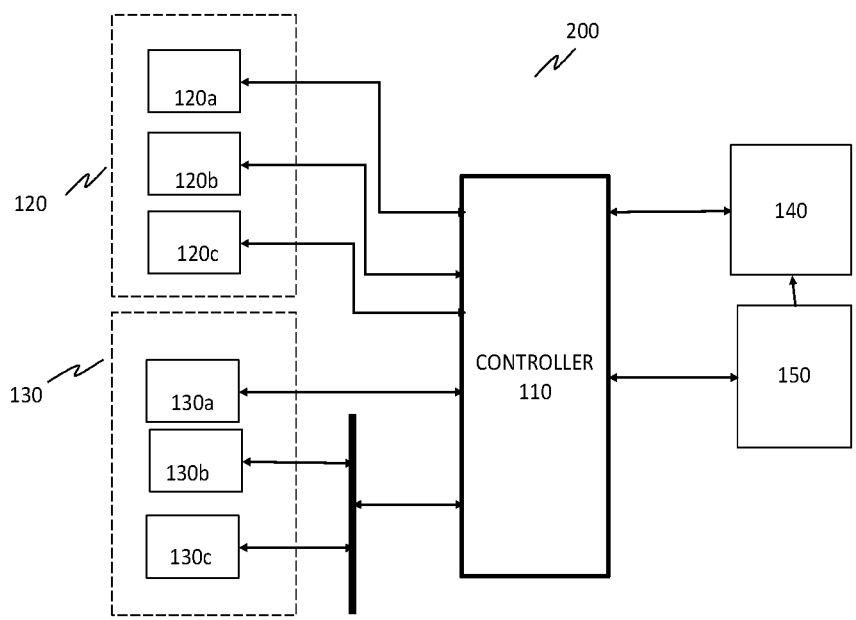
FIG. 2 illustrates a system for providing privacy enabled surveillance for a portion of a building with a building automation system.

FIG. 2 illustrates a system 200 for providing privacy enabled surveillance for a portion of a building with a building automation system. As shown in FIG. 2, the system 200 comprises a controller 110, a first set of sensors 120, a second set of sensors 130, alerting unit 140 and sensors for surveillance 150. The first set of sensors 120 can comprise sensors for detecting person-related information to identify a person, for example, an iris recognition sensor 120a, a hand geometry recognition sensor 120b, and face recognition sensor 120c. The second set of sensors 130 for detecting physical parameters associated with the at least one portion of the building can comprise human presence detectors for detecting the number of persons 130a, temperature sensors for detecting the ambient temperature of the portion of the building 130b, and glass break detectors 130c. It may be noted by the person skilled in the art that sensors shown (120a, 120b, 120c, 130a, 130b, 130c) are of an exemplary nature that are illustrated for ease of explanation and can comprise a myriad of other forms of sensors as mentioned before. The alerting unit 140 can comprise any mechanism that can trigger an audio or visual alarm, a communication to emergency authorities such as hospitals, police station, fire department or any other function of such nature. The alerting unit 140 operates to provide security with external support by alerting the concerned authorities such as civic authorities or personal emergency contact. The sensors for surveillance 150 can include image and video recorders, audio recorders or any other form of recorders capable of recording data of a private/personal nature of a person. The sensors for surveillance provide the recorded information for further analysis as may be needed, for example, by security agencies. The recorded information can be used as forensic evidence about an occurrence of an exigent event or an intrusion or entry of an unwanted/unfamiliar person. The recorded information can be stored locally/remotely associated with the individual registered user in the building automation system.

The data from the various sensors are processed to gather information by one or more controllers of the building automation system. The controllers can be locally present in the building or remotely located. Processing of data includes detecting number of persons in a portion of the building using sensors that detect physical parameters and not identifying persons. The controller also processes data from sensors that identifies persons to authenticate persons in the building or portion of the building. For the purpose of authentication, the controller makes use of (retrieves) pre-registered information about users from a local database of the building automation system. The pre-registered information can also be maintained in a remote database elsewhere including in a similar building automation system, i.e., in other participating systems over the internet or on a server accessible over the internet. The registered information can be any information that identifies a person and associable with any of the sensors deployed in the building to identify a person, for example, iris recognition data with iris detection sensors, fingerprint data with fingerprint sensors, facial feature data with face recognizing/image capturing sensors (camera), health parameter data (e.g. heartbeat, blood pressure with health band/sensors) and such other information of a nature capable of identifying a person. The controller is capable of receiving the registered (pre-registered) information (reference data) about the person for the purpose of authentication from the database of the building automation system or from a remote database of the similar building automation system or other participating systems and on identified servers used for authentication over the internet by users and thus available with the building automation system.

The controller by comparing the registered users' information with the information (including processed information) gathered with the sensors that identify a person to authenticate persons detected in the portion of the building. For example, the controller can authenticate the iris recognition data of a person in the portion of the building received from sensors for detecting person-related information with the iris recognition data available with the building automation system.

Further, in case of a visit by a new person (guest) who is not an intruder, then such a new person can be registered and new registration data can be stored for authentication purposes for all future visits by consent or retrieved for authentication purpose from an identified remote system (similar building automation system, participating system or external server on internet).

The controller determines the number of authenticated persons in the portion of the building based on successful authentication data. The controller also determines the number of persons in the portion of the building (or in the building) by processing data received from sensors for detecting physical parameters associated with the portion of the building (or in the building).

The controller can determine if there is a difference in number between the number of authenticated persons and the number of persons present in the same portion of the building. In case there is a difference, it can be ascertained that there is an unauthenticated entry by a person or an intrusion. In case no difference is detected, it is ascertained that no intrusion has occurred, since the number of authenticated persons is equal to the number of persons detected to be present in that portion of the building. When an intrusion is detected, the controller will activate a sensor for surveillance or initiate an alerting unit. The sensor for surveillance can begin recording on activation and provide necessary evidence for further analysis. Similarly the alerting unit can alert emergency authorities such as police, hospital, and fire department, etc., or execute an audio or visual alarm to alert the vicinity areas for immediate action. Additionally, the controller may analyze data recorded by the activated sensors for surveillance to activate the alerting units.

The present invention carries out any form of recording function only when an intrusion is detected based on a difference between the number of determined number of authenticated persons and the number of detected persons in the portion of the building. Hence, both security and privacy of a person is taken care of by this invention as any form of data which is of a private nature to a person, is recorded by the system on receiving a confirmation of an intrusion and also the alerting unit is initiated for immediate response by concerned authorities.

Figure 3:
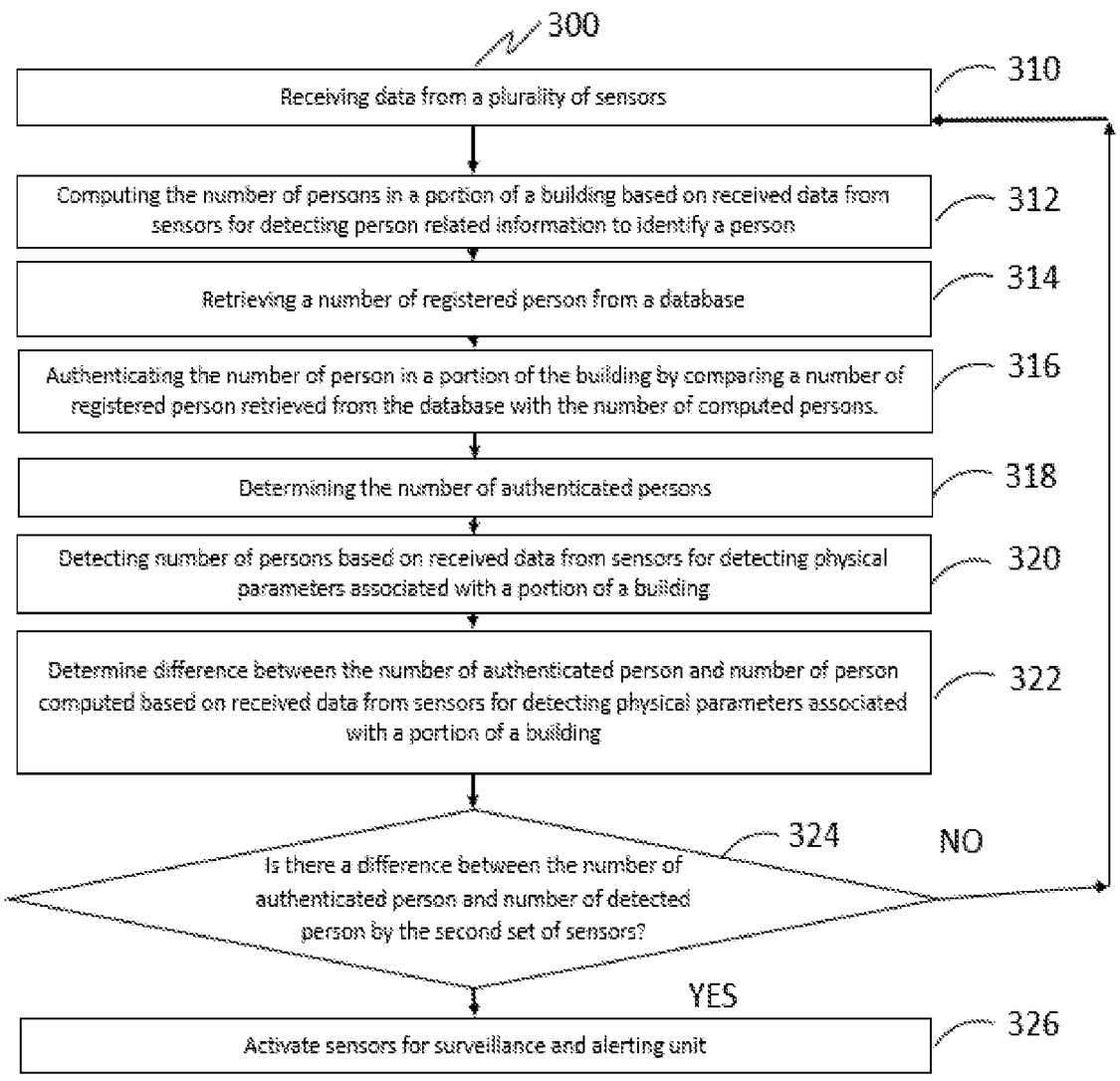
FIG. 3 is a flowchart of the method performed by a controller for providing privacy enabled surveillance for a portion of a building with a building automation system.

FIG. 3 is a flowchart 300 of the method performed by a controller for providing privacy enabled surveillance for a portion of a building with a building automation system. As shown in step 310 the controller receives data from a plurality of sensors. The received data from the plurality of sensors can comprise biometric data for identifying a person or physical parameters associated with a portion of the building. As depicted in step 312, the controller computes the number of persons in a portion of a building based on received data from sensors for detecting person-related information to identify a person. As depicted in step 314, the controller retrieves a number of registered persons from a database. The database can be located locally with the building automation system. The database can also be a remote database of a similar building automation system or other participating systems over the internet. As depicted in step 316, the controller authenticates the number of persons in the portion of the building by comparing a number of registered persons retrieved from the database at step 314 with the number of computed persons as depicted in step 312. As shown in step 318, the controller determines the number of authenticated persons as the authentication is already done at step 316 and the controller comprises the authentication data. As depicted in step 320, the controller detects the number of persons based on received data from sensors for detecting physical parameters associated with a portion of a building. For example, the physical parameters associated with the portion of the building comprises the number of persons present in the portion of the building. Sensors, like human presence detectors, can detect the number of persons present in an environment. As the controller is now equipped with data about the number of authenticated persons from step 318 and number of persons present with the portion of the building from step 320, as shown in step 322, the difference is determined between the number of authenticated persons and number of persons present in the portion of the building. As depicted in step 324, the controller decides to activate sensors for surveillance and to the alerting units, if a difference in number exists from step 322. In case no difference exists from step 322, as shown in step 324, the controller starts performing all the steps from 310 onwards. As depicted in step 326, the controller activates the sensors for surveillance and the alerting unit after a decision is taken at step 324.

It may be noted by the person skilled in the art that some of the sensors mentioned herein may possess processing capabilities and may provide the controller with processed data as opposed to raw data for processing further by the controller. Also, a controller can be configured to capture behavior patterns of a person from the detected signals and raw data that can be used to authenticate the person and/or detect an emergency situation including a medical emergency. The controller may be interfaced one to one for communicating with the sensors and also it may be interfaced using proprietary or standardized network communication protocols, such as KNX. The sensors mentioned herein may be installed in a home environment, for example, some sensors may be installed in walls, doors, windows, beds, mattresses, pillows, couches, fans, lights, air conditioners and the like. The sensors may also be wearable devices by a person, such as health bands capable of monitoring heartbeat, body temperature, number of steps taken and other human body related physical parameters.

In an embodiment, the controller 110 receives information about health and wellness of the authenticated person and detects an unusual or exigent event, for example, high body temperature indicating fever and may activate the alerting unit 140 for alerting medical agencies.

In an embodiment, the controller 110 activates a home appliance based on information from the sensor that is capable of sensing information that identifies an individual and the sensor that is capable of sensing parameters related to a building. For example, the controller can adjust temperature of the air conditioner 130*d* in a room based on the preference of the authenticated person in the portion of the building.

Figure 4:
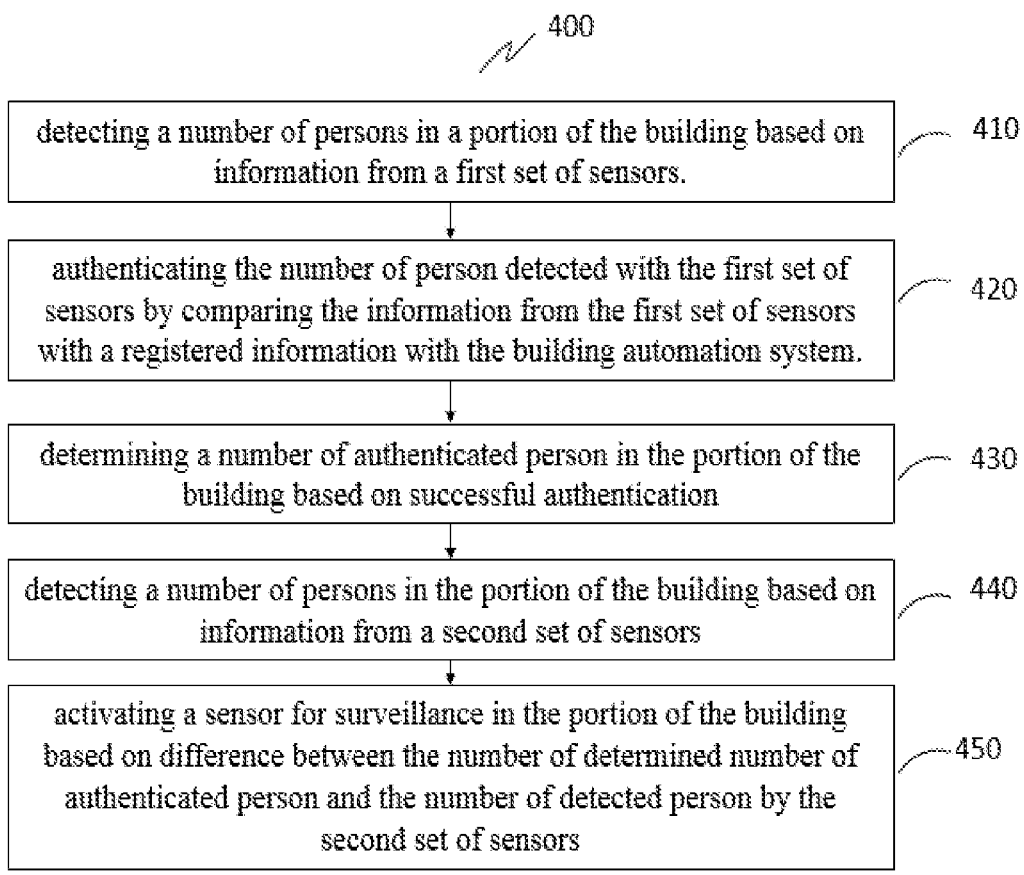
FIG. 4 illustrates a method for providing privacy enabled surveillance for at least one portion of a building with a building automation system.

FIG. 4 illustrates a method 400 performed by the controller 110 for providing privacy enabled surveillance for at least one portion of a building with the building automation system. As depicted in step 410, the controller detects a number of persons in a portion of the building based on information from a first set of sensors. The first set of sensors is for detecting person-related information to identify a person. As depicted in step 420, authenticating the number of persons detected with the first set of sensors by comparing the information from the first set of sensors with a registered information with the building automation system. As depicted in step 430, determining a number of authenticated persons in the portion of the building based on successful authentication. As shown in step 440, detecting a number of persons in the portion of the building based on information from a second set of sensors. The second set of sensors is for detecting physical parameters associated with the at least one portion of the building. As depicted in step 450, activating sensors for surveillance in the portion of the building based on difference between the number of determined number of authenticated persons and the number of detected persons by the second set of sensors.

The present invention can be implemented in a myriad of ways. Some exemplary uses and configuring (mode) options are provided below:

Security monitoring when set to 'privacy' mode.

The system may be operated in a 'privacy' mode, wherein the system operates on the presumption that only authorized or authenticated persons are present in the portion of the building. Activities during this period are private to the persons concerned and no recording is carried out. However, all other sensors continue to assess its surrounding situation by being sensitive to signs of emergency. If an attacker or intruder enters the premise, then the authenticated person can either gaze at the gaze sensor or perform a unique gesture to activate the system to initiate emergency procedures including activating an emergency alarm, record gathering, and visual recording. The system is capable of activating sensors for surveillance based on behavioral patterns of persons in the portion of the building, e.g., the gaze sensor placed around the wall clock can detect the gazing pattern of a person.

Emergency Assistance

Further wellness and health monitoring systems which are also part of security systems of the building automation system will notify appropriate personnel including emergency contacts as well as nearest hospital/ambulance service as and when any exigency is detected.

Security Monitoring when Set to 'Party' Mode.

During events like get-togethers and parties, typically chances of unexpected events happening is on the higher side. During such times, it is often required to switch off/deactivate some of the security sensors, e.g., the door is kept open for too long and door sensor is deactivated as people walk in and out. During such times, it is prudent to record the events as a matter of precaution. The same can be deleted post-event if everything went off smoothly and the recording is no longer needed. Else, evidence is already recorded for necessary actions.

Security Monitoring when Set to 'Away' Mode

Usually the cameras, e.g., closed-circuit television (CCTV) cameras, run continuously recording the images or recording happens whenever any movement is detected. When there is no-one or the system is set to 'away' mode, any kind of intrusion including door opening to breaking in are recorded and alarms raised as and when detected. To that extent, this system is similar to existing home security systems.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method for providing privacy enabled surveillance for at least one portion of a building with a building automation system, the building automation system comprising a plurality of sensors communicatively coupled to a controller of the building automation system, wherein the plurality of sensors includes a first set of sensors for detecting person-related information to identify a person and a second set of sensors for detecting physical parameters associated with the at least one portion of the building, the method comprising:

detecting, with the controller, a first number of persons in the at least one portion of the building based on information from the first set of sensors for detecting person-related information that identifies a person;

authenticating, with the controller, the first number of persons detected with the first set of sensors by comparing the information from the first set of sensors with registered information of the building automation system and determining a number of authenticated persons in the at least one portion of the building based on successful authentication;

detecting, with the controller, a second number of persons in the at least one portion of the building based on information from the second set of sensors for detecting physical parameters associated with the at least one portion of the building; and activating, with the controller, at least one sensor for surveillance from the plurality of sensors in the at least one portion of the building based on a difference between the number of authenticated persons in the at least one portion of the building and the second number of persons detected by the second set of sensors.

2. The method as claimed in claim 1, further comprising activating an alerting unit based on the difference between the number of authenticated persons in the at least one portion of the building and the number of persons detected by the second set of sensors.

3. The method as claimed in claim 1, further comprising activating an alerting unit based on analyzed information from the activated at least one sensor for surveillance.

4. The method as claimed in claim 1, further comprising activating at least one home appliance based on information from at least one sensor from the first set of sensors and at least one sensor from the second set of sensors.

5. The method as claimed in claim 1, wherein the information from first set of sensors comprises biometric information.

6. A building automation system for providing privacy enabled surveillance for at least one portion of a building, the building automation system comprising:

a plurality of sensors including a first set of sensors for detecting person-related information to identify a person and a second set of sensors for detecting physical parameters associated with the at least one portion of the building, a controller communicatively coupled to the plurality of sensors, wherein the controller is configured to:

detect a first number of persons in the at least one portion of the building based on information from the first set of sensors for detecting person-related information that identifies a person;

authenticate the first number of persons detected with the first set of sensors by comparing the information from the first set of sensors with registered information of the building automation system and determining a number of authenticated persons in the at least one portion of the building based on successful authentication;

detect a second number of persons in the at least one portion of the building based on information from the second set of sensors for detecting physical parameters associated with the at least one portion of the building; and activate at least one sensor for surveillance from the plurality of sensors in the at least one portion of the building based on a difference between the number of authenticated persons in the at least one portion of the building and the second number of persons detected by the second set of sensors.

7. The building automation system as claimed in claim 6, wherein the controller is further configured to operate in at least one of a privacy mode, a party mode, and an away mode.

8. The building automation system as claimed in claim 6, wherein the controller is interfaced one-to-one for communicating with the plurality of sensors.

9. The building automation system as claimed in claim 6, wherein the controller is interfaced through a KNX communication protocol.

10. The building automation system as claimed in claim 6, wherein the first set of sensors for detecting person-related information to identify a person are biometric sensors; wherein the biometric sensors include sensors for iris recognition, fingerprint, gesture recognition, palm veins, face recognition, gaze, health and wellness, voice recognition, hand geometry, and body odor.

* * * * *